United States Patent
Uno et al.

(10) Patent No.: US 7,181,919 B2
(45) Date of Patent: Feb. 27, 2007

(54) SYSTEM UTILIZING WASTE HEAT OF INTERNAL COMBUSTION ENGINE

(75) Inventors: Keiichi Uno, Kariya (JP); Hironori Asa, Okazaki (JP); Atsushi Inaba, Kariya (JP); Takashi Yamanaka, Kariya (JP); Hideji Yoshida, Hashima (JP); Hiroshi Ogawa, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 164 days.

(21) Appl. No.: 11/085,110

(22) Filed: Mar. 22, 2005

(65) Prior Publication Data

US 2005/0217288 A1  Oct. 6, 2005

(30) Foreign Application Priority Data

Mar. 31, 2004  (JP)  ............................. 2004-104816

(51) Int. Cl.
 *G05D 23/32* (2006.01)
(52) U.S. Cl. ....................................................... 62/157
(58) Field of Classification Search ............ 62/DIG. 2, 62/126, 157, 158, 6, 160, 172, 238.4, 238.6, 62/323.1; 60/614, 616, 618, 670, 671–675; 417/12, 437; 165/62–64
 See application file for complete search history.

(56) References Cited

U.S. PATENT DOCUMENTS

| | | | | |
|---|---|---|---|---|
| 3,259,176 A | * | 7/1966 | Rice et al. .................. | 165/265 |
| 3,355,903 A | * | 12/1967 | La Fleur ......................... | 62/88 |
| 3,668,884 A | * | 6/1972 | Nebgen ...................... | 62/228.5 |
| 3,902,546 A | * | 9/1975 | Linhardt et al. ............. | 165/240 |
| 4,267,692 A | * | 5/1981 | Earnest ..................... | 60/39.181 |
| 4,271,664 A | * | 6/1981 | Earnest ..................... | 60/39.181 |
| 4,347,711 A | | 9/1982 | Noe et al. | |
| 5,291,735 A | * | 3/1994 | Kesten ............................ | 62/4 |
| 5,351,487 A | * | 10/1994 | Abdelmalek .................. | 60/618 |
| 6,365,289 B1 | * | 4/2002 | Lee et al. ...................... | 429/13 |
| 6,581,384 B1 | * | 6/2003 | Benson ........................ | 60/653 |
| 6,606,848 B1 | * | 8/2003 | Rollins, III .............. | 60/39.182 |
| 2004/0216483 A1 | | 11/2004 | Inaba et al. | |

FOREIGN PATENT DOCUMENTS

| | | |
|---|---|---|
| EP | EP 0 045 179 B1 | 2/1982 |
| JP | 63092021 * | 4/1988 |
| JP | B2-2540738 | 7/1996 |

OTHER PUBLICATIONS

Office Action from German Patent Office issued on Aug. 4, 2006 for the corresponding German patent application No. 10 20005 014 129.3 (a copy and English translation thereof).

* cited by examiner

*Primary Examiner*—Mohammad M. Ali
(74) *Attorney, Agent, or Firm*—Posz Law Group, PLC

(57) ABSTRACT

A waste heat energy recovery system has a refrigerant cycle and a Rankine cycle. When the cycle operation is changed from the refrigerant cycle to the Rankine cycle, an expansion device is started after the pump is started. When the cycle operation is changed from the Rankine cycle to the refrigerant cycle, the expansion device is stopped after the pump is stopped.

23 Claims, 10 Drawing Sheets

SYSTEM UTILIZING WASTE HEAT OF INTERNAL COMBUSTION ENGINE

CROSS REFERENCE TO RELATED APPLICATION

This application is based on Japanese Patent Application No. 2004-104816 filed on Mar. 31, 2004, the disclosure of which is incorporated herein by reference.

FIELD OF THE INVENTION

The present invention relates to a system utilizing waste heat of an internal combustion engine. The system recovers the waste heat of the internal combustion engine, especially of the internal combustion engine with a refrigerant cycle and a Rankine cycle.

BACKGROUND OF THE INVENTION

Japanese Patent No. 2540738 shows a conventional system which utilizes a waste hest of an internal combustion engine. This system includes a pressure pump and a heater both of which are arranged in parallel to an evaporator of the refrigerant cycle. The pressure pump pressurizes a refrigerant in the refrigerant cycle, and the heater heats the refrigerant in the refrigerant cycle by performing heat-exchange between the engine coolant and the refrigerant. A three-way valve can be switched in such a manner that the pressure pump and the heater are selectively fluidly connected to the refrigerant cycle. A compressor driven by the engine serves as an expansion device, which expands a refrigerant to change a refrigerant pressure to a kinetic energy.

When the refrigerant flows through the pressure pump and the heater, a Rankine cycle is established using the compressor as the expansion device. The heat energy derived from the engine coolant is recovered as the kinetic energy. The kinetic energy is returned to the engine to improve the fuel economy.

The above Japanese patent shows control conditions of the each component such as the three-way valve, the pressure pump, and the compressor. However, is does not show the appropriate control to change the cycle between the refrigerant cycle and the Rankine cycle.

The inventors of the present invention experimentally confirmed following facts. In the case that the operation cycle is changed from the refrigerant cycle to the Rankine cycle, if the pressure pump is operated and the expansion device is in an operational condition, the refrigerant flows into the expansion devise and is expanded therein, so that the pressure pump has a difficulty to increase the pressure of the refrigerant in a short period whereby the energy is hardly recovered effectively. If the energy is not recovered in a short period, the air-conditioning may be deteriorated.

Furthermore, when the Rankine cycle is changed to the refrigerant cycle, since the lower-side pressure of the refrigerant at the starting of the compressor is higher than that at the ordinary starting of the compressor in the refrigerant cycle, a higher starting torque than usual is necessary to start the compressor. Thus, the power loss of the compressor is increased, so that the engine hardly starts smoothly. When the operation cycle is changed into the refrigerant cycle while the pressurized refrigerant by the pressure pump is not used as an effective power, the working of pressure pump is wasted and the power loss of the pressure pump is increased.

As described above, when the refrigerant cycle and the Rankine cycle are alternatively operated, various losses are generated and the energy efficiency is not well improved.

SUMMARY OF THE INVENTION

The present invention is made in view of the foregoing matter and it is an object of the present invention to provide a system utilizing a waste heat of an internal combustion engine, which can reduce an energy loss at the time of changing between the refrigerant cycle and the Rankine cycle and can recover energy efficiently.

According to a heat exchanger of the present invention, the system includes a refrigerant cycle, the Rankine cycle and a controller. The refrigerant cycle includes a compressor and a condenser. The compressor compresses a refrigerant, receiving a driving force from the internal combustion engine. The condenser cools the refrigerant discharged from the compressor. The Rankine cycle includes the condenser commonly used in the refrigerant cycle; a pump pressurizing the refrigerant flowing out from the condenser; a heater heating the refrigerant discharged from the pump with the waste heat of the internal combustion engine; and an expansion device generating a kinetic energy by expanding the gas-phase refrigerant flowing out of the heater. The controller switches an operation cycle between the refrigerant cycle and the Rankine cycle, and controls operations of the refrigerant cycle and the Rankine cycle. The controller starts an operation of the expansion device after the pump is operated when the refrigerant cycle is changed into the Rankine cycle.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

[First Embodiment]

Figure 1:
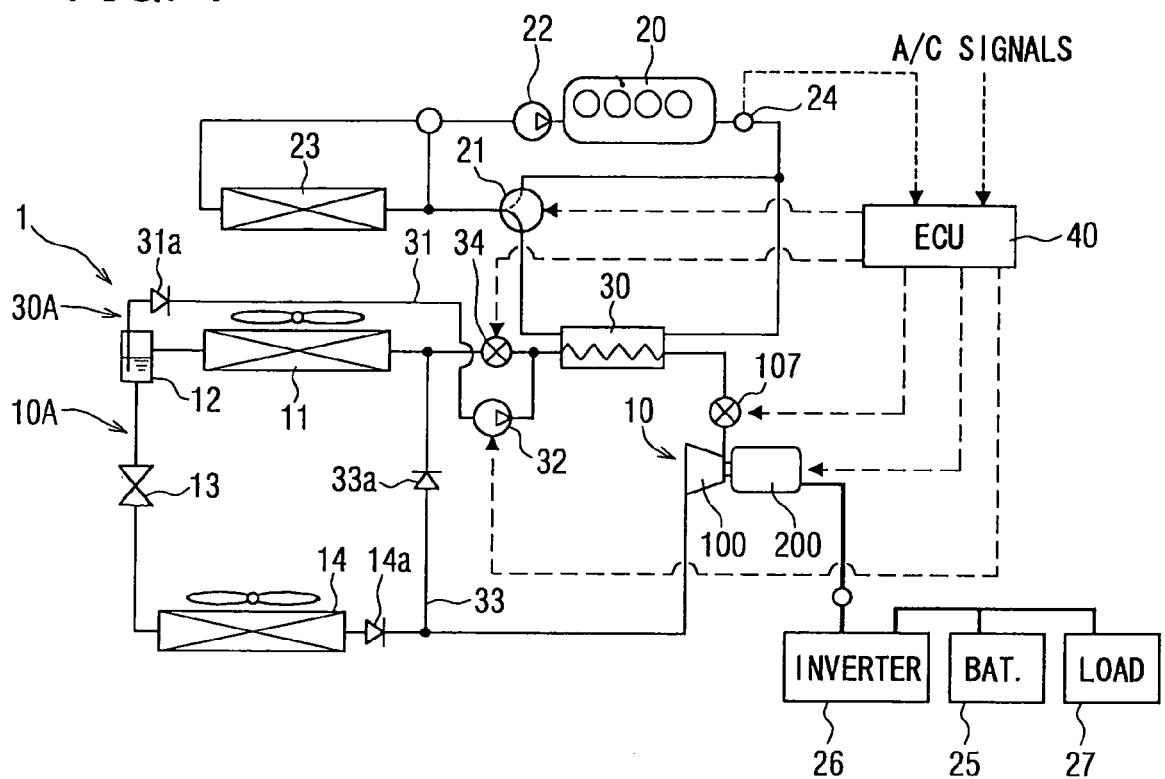
FIG. 1 is a schematic view of a system utilizing waste heat for an internal combustion engine according to a first embodiment of the present invention.

In a first embodiment, a system utilizing waste heat of an internal combustion engine is mounted on a hybrid vehicle or a vehicle with an engine which stops at idling. The system utilizing waste heat of the internal combustion engine is referred to as a waste heat utilizing system 1 hereinafter, and the internal combustion engine is referred to as an engine 20 hereinafter. The waste heat utilizing system 1 includes a refrigerant cycle 10A and a Rankine cycle 30A which recovers energy of waste heat generated in the engine 20. An electronic control unit 40, which is referred to as ECU 40 hereinafter, controls each of the cycles 10A, 20A. Referring to FIG. 1, a whole arrangement of the waste heat utilizing system 1 is described.

An expansion-compression device 10 is a fluid machine which operates in a pump-mode where gas-phase refrigerant is compressed and discharged, and in a motor-mode where an expanding fluid pressure of the super-heated gas-phase refrigerant is converted into a kinetic energy to output a mechanical energy. A condenser 11 which communicates with an outlet (high-pressure port 110, described below) of the expansion-compression device 10 cools the refrigerant, radiating the heat thereof. A structure of the expansion-compression devise 10 is described below in detail.

A gas-liquid separator 12 is a receiver which separates the refrigerant flowed from the condenser 11 into the gas-phase refrigerant and the liquid-phase refrigerant. A decompression devise 13 is a thermal-operated expansion valve which decompresses and expands the liquid-phase refrigerant under a constant enthalpy by adjusting an aperture thereof. Thus, a superheated degree of the refrigerant upstream of the expansion-compression devise 10 is maintained in a predetermined value in a case that the expansion-compression devise 10 operates in the pump-mode.

An evaporator 14 evaporates the refrigerant flowing therethrough. When the expansion-compression devise 10 operates in the pump-mode, a check valve 14a allows a flow of the refrigerant toward suction port (low-pressure port 111, described below).

The refrigerant cycle 10A comprises the expansion-compression devise 10, the condenser 11, the gas-liquid separator 12, the decompression devise 13 and the evaporator.

A heater 30 is provided in a refrigerant circuit between the expansion-compression devise 10 and the condenser 11. The heater 30 performs heat-exchange between the refrigerant flowing therethrough and an engine coolant, so that the refrigerant is heated. A three-way valve 21 changes between a position where the engine coolant flows into the heater 30 and a position where the engine coolant does not flows into the heater 30. The ECU 40 controls the three-way valve 21.

A first bypass passage 31 introduces the liquid-phase refrigerant in the separator 12 to the inlet of heater 30. A liquid pump 32, which corresponds to a pump of the present invention, and a check valve 31a allowing a flow toward the heater 30 are provided in the first bypass passage 31. The liquid pump 32 is an electric pump in this embodiment and is controlled by the ECU 40.

A second bypass passage 33 fluidly connects the discharge side (the low-pressure port 111) of the expansion-compression devise 10 in the motor-mode with the inlet side of the condenser 11. The second bypass passage 33 is provided with a check valve 33a which allows a refrigerant flow from the expansion-compression devise 10 toward the condenser 11.

An open/close valve 34 is an electromagnetic valve disposed between the condenser 11 and the heater 30. The ECU 40 controls the open/close valve 34. A valve mechanism 107 is provided at the discharge side (high-pressure chamber 104, described below) of the expansion-compression devise 10. The valve mechanism 107 switches the operation of the expansion-compression devise 10 between the pump-mode and the motor-mode.

The Rankine cycle 30A recovering energy from the wasted heat by means of the expansion-compression devise 10 comprises the gas-liquid separator 12, the liquid pump 12, the heater 32, and the condenser 11 commonly used with the refrigerant cycle 10A.

A water pump 22 circulates an engine coolant between the engine 20, a radiator 23 and the heater 30. The radiator 23 performs heat-exchange between the engine coolant and an ambient air to cool the engine coolant. The water pump 22 is a mechanical pump driven by the engine 20. An electric pump driven by an electric motor can be used as the water pump 22 instead of the mechanical pump.

A water temperature sensor 24 detects a temperature of the engine coolant flowing out from the engine 20 to output a coolant temperature signal to the ECU 40.

The ECU 40 receives an A/C signal, which is determined based on a set temperature established by a passenger, an environmental condition and the like. The ECU 40 controls the operations of the three-way valve 21, the liquid pump 32, the open/close valve 34, and the expansion-compression devise 10 including the valve mechanism 107, a rotational electric machine 200, and an electromagnetic clutch 300.

A battery 25 supplies regulated electricity to the rotational electric machine 200. An inverter 26 is provided between the battery 25 and the rotational electric machine 200 for converting AC electricity to DC electricity. The electric power generated by the rotational electric machine 200 is charged in the battery 25 for being supplied to electric loads 27 such as headlights and auxiliary equipment.

Figure 2:
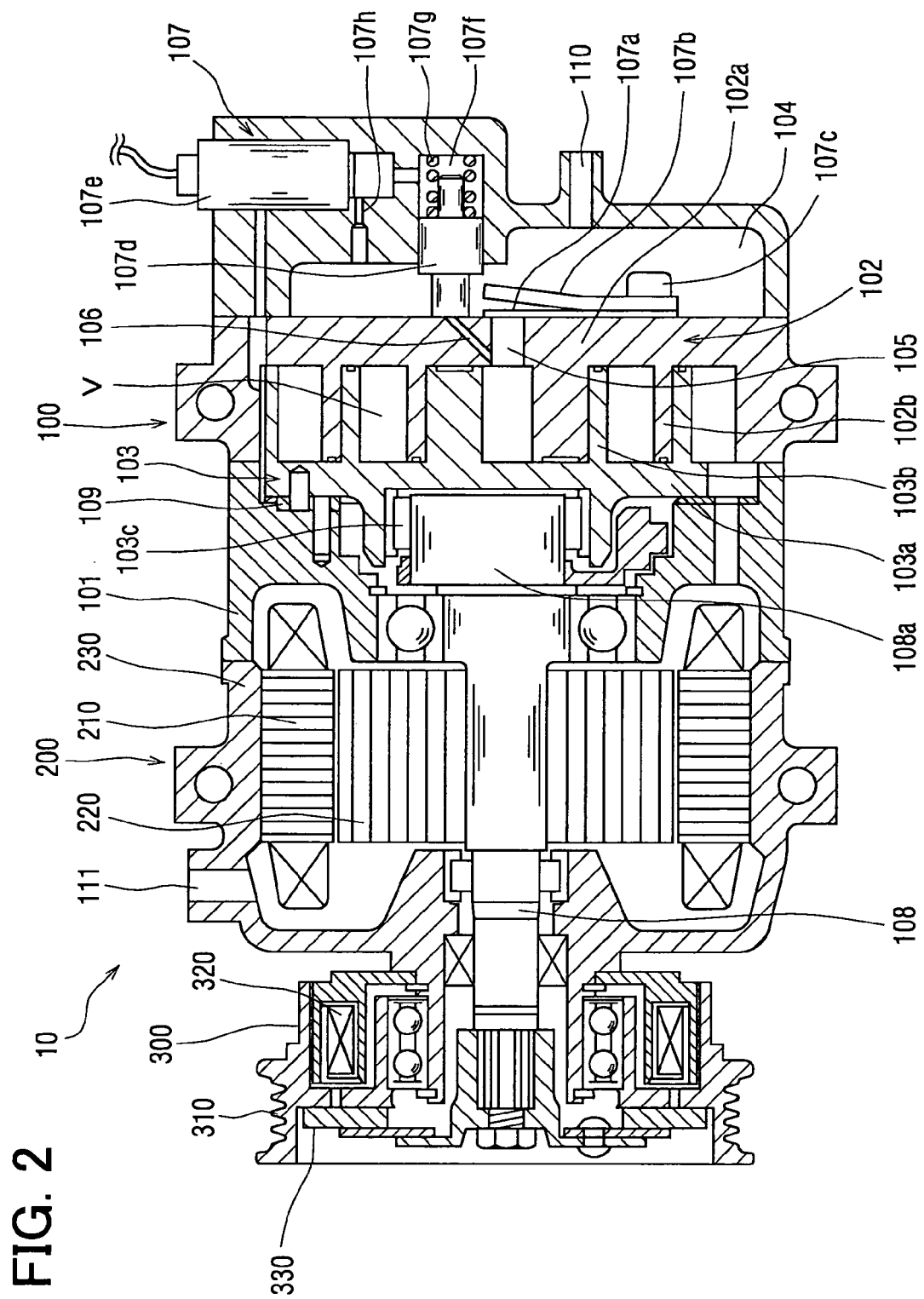
FIG. 2 is a longitudinal sectional view of an expansion-compression device according to the first embodiment of the present invention.

Referring to FIG. 2, a structure of the expansion-compression device 10 is described in detail hereinafter.

The expansion-compression device 10 comprises a pump-motor mechanism 100 which compresses or expands the refrigerant, the rotational electric machine 200 connected to a shaft of the pump-motor mechanism 100, the electromagnetic clutch 300 which transfers a rotational torque to the shaft 108.

The rotational electric machine 200 comprises a stator 210 and a rotor 220 which rotates within the stator 210. A stator housing 230 accommodates the stator 210 and the rotor 220. When the electricity is supplied to the stator 210 from the battery 25 through the inverter 26, the rotor 220 drives the pump-motor mechanism 100 so that the rotational electric machine 200 functions as an electric motor. On the other hand, when a torque is supplied to the rotor 220, the rotational electric machine 200 functions a generator which generates electricity.

The electromagnetic clutch 300 comprises a pulley 310, a coil 320, and a friction plate 330. The pulley 310 receives a rotational force from the engine 20 through a V-belt (not shown). The coil 320 generates a magnetic field. When the coil 320 is energized, the friction plate 330 is displaced in order to transfer the rotation torque from the pulley 310 to the shaft 108.

The pump-motor mechanism 100 has the same structure as a well-known scroll compressor. That is, a middle housing 101 is connected to the stator housing 230 to which a fixed scroll 102 is fixed. The middle housing 101 and the fixed scroll 102 accommodate a movable scroll 103. The movable scroll 103 orbits relative to the fixed scroll 102. The fixed scroll 102 and the movable scroll 103 form operation-chambers "V" therebetween. The high-pressure chamber 104 is provided to receive a high-pressure refrigerant. The valve mechanism 107 opens/closes communication passages 105, 106 which fluidly connect the operation chambers "V" and the high-pressure chamber 104.

The fixed scroll 102 includes a base plate 102a and a movable spiral blade 102b which protrudes from the base plate 102a. The movable scroll 103 includes a base plate 103a and a movable spiral blade 103b which engages with the movable spiral blade 102b. The movable scroll 103 orbits while the movable spiral blade 102b and the fixed spiral blade 103b are engaging with each other, so that the volume of the operation chamber "V" decreases in the pump-mode and increases in the motor mode.

The shaft 108 functions as a rotational axis of the rotor 220 and has an eccentric portion 108a at an end thereof. The movable scroll 103 is rotatably connected to the eccentric portion 108a through a bearing 103c.

A rotation-preventing mechanism 109 makes it possible that the movable scroll 103 orbits while preventing a rotation thereof. When the shaft 108 rotates, the movable scroll 103 orbits with respect to the shaft 108 so that the volume of the operation chamber "V" decreases according as it closes to the center of the movable scroll 103 and that the volume of the operation chamber "V" increases according as it moves away from the center.

The communication passage 105 is an outlet port which fluidly connects the operation chamber "V" in a minimum volume to the high-pressure chamber 104 in order to discharge the compressed refrigerant to the high-pressure chamber "V". The communication passage 106 is an inlet port which fluidly connect the operation chamber "V" in a maximum volume to the high-pressure chamber 104 in order to introduce the super-heated gas-phase refrigerant in the high-pressure chamber 104 into the operation chamber "V". The communication passage 105 is referred to as an outlet port 105, and the communication passage 106 is referred to as an inlet port 106.

The high-pressure chamber 104 has a function that a discharged refrigerant pulsation is reduced. The high-pressure chamber 104 is provided with a high-pressure port 110 which is fluidly connected to the heater 30 and the condenser 11.

The stator housing 230 is provided with a low-pressure port 111 fluidly connected to the evaporator 14 and the second bypass passage 33. The low-pressure port 111 is also fluidly connected to a space between the stator housing 230, the middle housing 101 and the fixed scroll 102.

A discharge valve 107a is a check valve which is provided on the outlet port 105 and prevents the discharged refrigerant in the high-pressure chamber 104 from back-flowing into the operation chamber "V". A valve stopper 107b is fixed on the base plate 102a with a bolt 107c for restricting a maximum lift of the valve 107a.

A spool 107a is a valve body which opens/closes the inlet port 106. An electromagnetic valve 107e controls a pressure in a backpressure chamber 107f by controlling a communication between the low-pressure port 111 and the backpressure chamber 107f. A spring 107g urges the spool 107a in a direction that the inlet port 106 is closed. A restriction 107h fluidly connects the backpressure chamber 107f with the high-pressure chamber 104 with a certain amount of a fluid resistance.

When the electromagnetic valve 107e is opened, the pressure in the backpressure chamber 107f becomes less than that in the high-pressure chamber 104. Then the spool 107d moves rightward in FIG. 2 to cause opening of the inlet port 106. Since a pressure-loss at the restriction 107h is very small, the amount of refrigerant flowing from the high-pressure chamber 104 to the backpressure chamber 107f is negligible.

On the other hand, when the electromagnetic valve 107e is closed, the spool 107d is displaced leftward in FIG. 2 by a biasing force of the spring 107g so that the inlet port 106 is closed. That is, an electric pilot valve opening/closing the inlet port 106 is structured by the spool 107d, the electromagnetic valve 107e, the backpressure chamber 107f, the spring 107g, and the restriction 107h. The valve mechanism 107 comprises the electric pilot valve and the discharge valve 107a, the valve mechanism 107 switching the pump-motor mechanism 100 between in the pump mode and in the motor mode. The ECU 40 controls the operation of the valve mechanism 107, more precisely the electromagnetic valve 107e.

Figure 3:
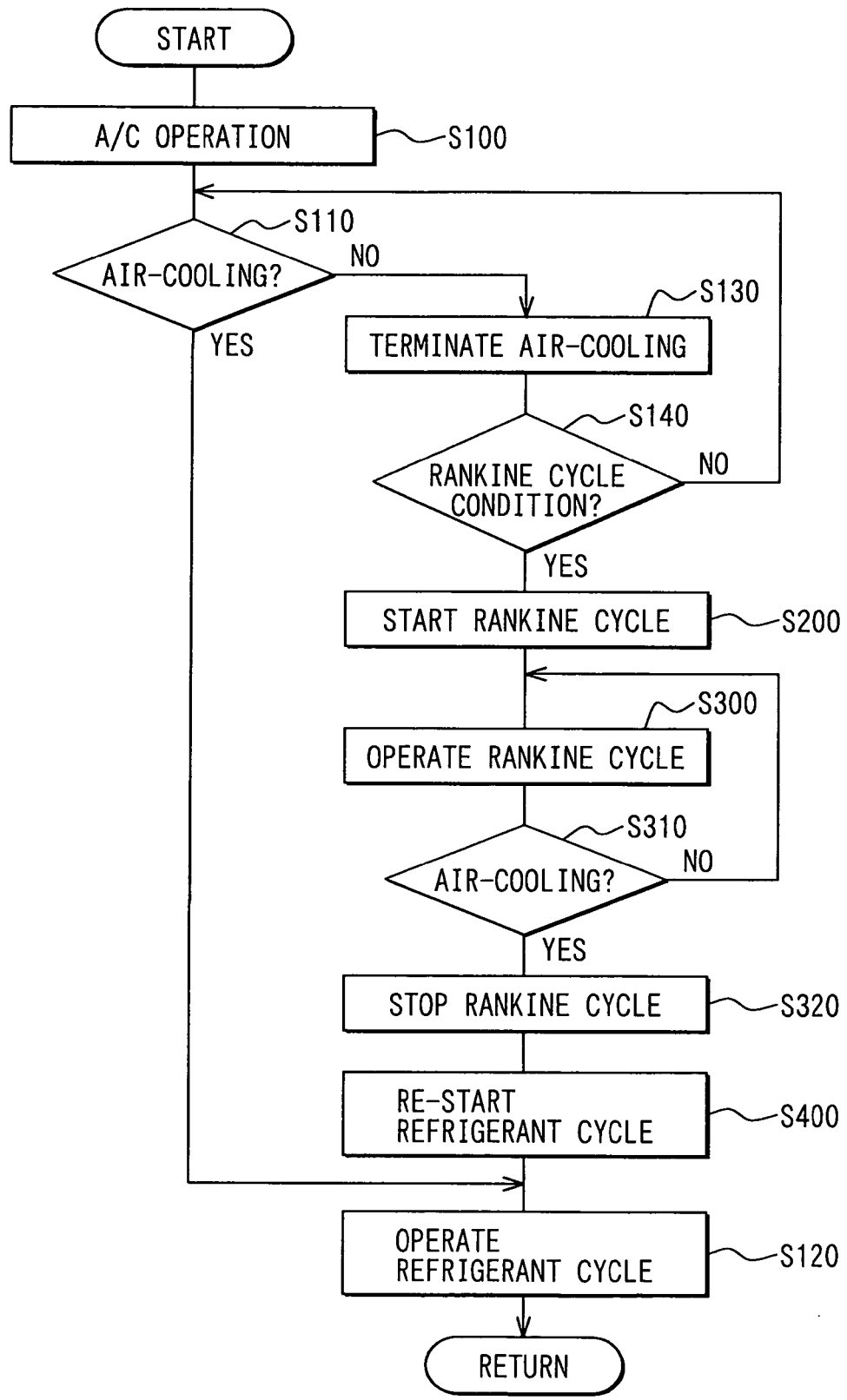
FIG. 3 is a main flowchart in which a refrigerant cycle and a Rankine cycle are alternatively operated.
Figure 4:
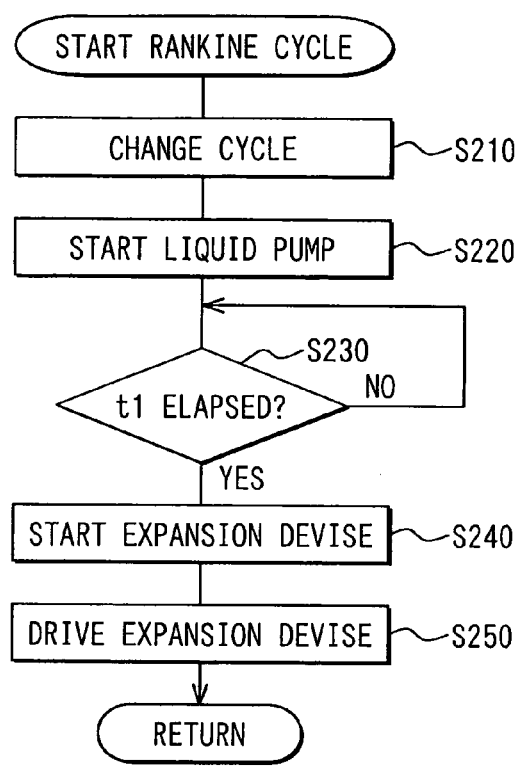
FIG. 4 is a sub-flowchart in which the Rankine cycle starts its operation.
Figure 5:
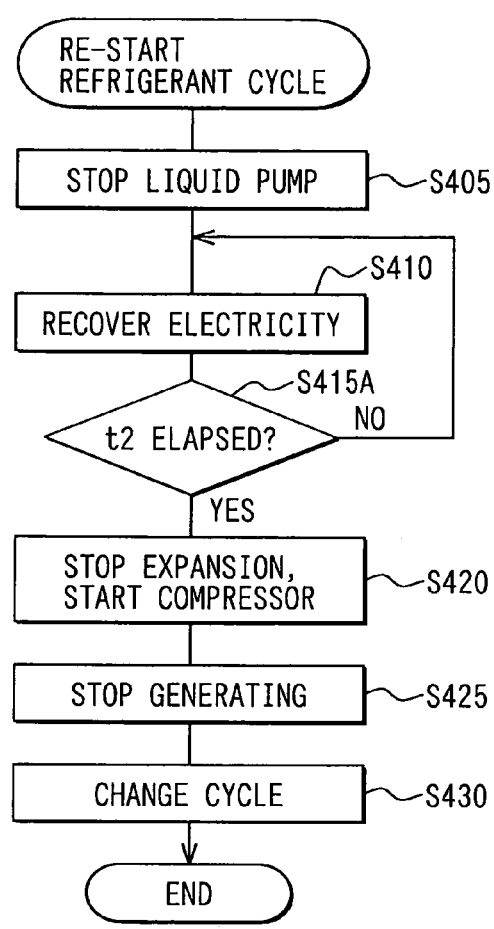
FIG. 5 is a sub-flowchart in which the refrigerant cycle is re-started according to the first embodiment of the present invention.
Figure 6:
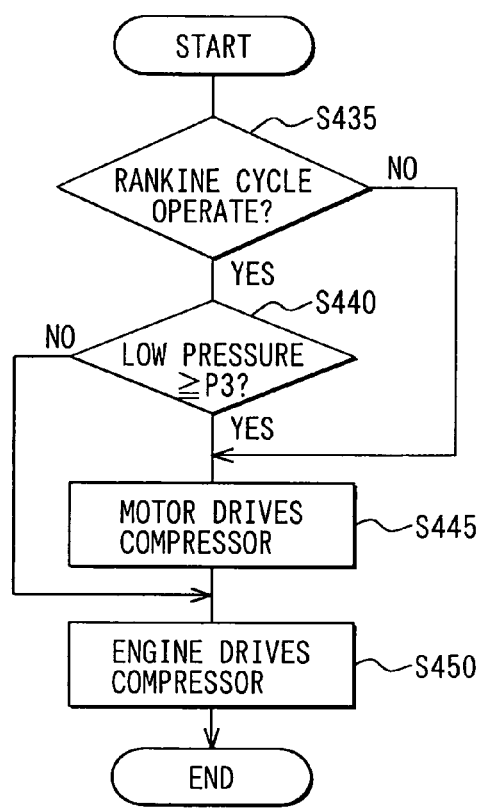
FIG. 6 is a sub-flowchart in which air-cooling mode is conducted.

Referring to FIGS. 3 to 6, the operation of the system 1 is described hereinafter. FIG. 3 is a main flowchart, and FIGS. 4 to 6 are sub-flowcharts. In these flowcharts, when the pump-motor mechanism 100 is operated in the pump mode, the pump-motor mechanism 100 is referred to as a compressor, and when in the motor mode, the pump-motor mechanism 100 is referred to as an expansion devise. When the electric rotating machine 200 generates the electricity, the electric rotating machine 200 is referred to as a generator. When the electric rotating machine 200 is used as an electric power source, the rotational electric machine 200 is referred to as a motor.

When the ECU 40 receives an air-conditioning requirement signal from a passenger, the ECU 40 starts air-conditioning operation in step S100. The pump-motor mechanism 100 starts to compress the refrigerant in the refrigerant cycle 10A.

The open/close valve 34 is opened while the liquid pump 32 is not driven. The three-way valve 21 is turned in such a manner that no engine coolant flows into the heater 30. The electric valve 107e is closed to close the inlet port 106 by means of the spool 107d.

When the engine 20 is running, the rotational force of the engine 20 is transmitted to the shaft 108 with the electromagnetic clutch 300 being engaged. When the engine 20 is stopped, the rotational electric machine 200 rotates the shaft 108 with the electromagnetic clutch 300 being disengaged.

In the present embodiment, the shaft 108 is commonly used by the rotor 220 and the pump-motor mechanism 100. When the shaft 108 is driven by the engine, the rotational electric machine 200 operates as a generator. Thus, it is preferable that the generated electricity is charged in the battery 25 or the rotational electric machine 200 does not become some load to the engine 20, receiving electricity to the stator 210.

The expansion-compression device 10 sucks the refrigerant into the operation chamber "V" through the low-pressure port 111, and compresses the refrigerant therein. The compressed refrigerant is discharged toward the condenser 11 through the outlet port 105, the high-pressure chamber 104 and the high-pressure port 110 in the same manner as the well-known scroll compressor.

The discharged refrigerant circulates through the heater 30, the open/close valve 34, the condenser 11, the gas-liquid separator 12, the decompression device 13, the evaporator 14, the check valve 14a, and the low-pressure port 111 of the expansion-compression device 10 in this series, whereby the refrigerant cycle 10A is established. The evaporator 14 absorbs heat from the air which is to be introduced into the interior of the vehicle. Since the engine coolant does not flow into the heater 30, the refrigerant is not heated by the engine coolant. The heater 30 is just a passage through which the refrigerant flows at this cycle.

Next, the procedure proceeds to step S110 in which the ECU 40 determines whether the air-cooling should be maintained based on the air-conditioning requirement signal and the like. When it is "Yes" in step S110, the procedure proceeds to step S120 in which the refrigerant cycle is kept running (steady operation).

When it is determined "No" in step S110, the procedure proceeds the step S130 in which the air-cooling operation is terminated. That is, the electromagnetic clutch 300 is brought to be disengaged, or the operation of the pump-motor mechanism 100 is stopped.

In step S140, the ECU 40 determines whether the condition for operating the Rankine cycle is established based on the detected signal of the water temperature sensor 24. When the temperature of the engine coolant is higher than a predetermine value, it is determined that the condition for operating the Rankine cycle has been satisfied so that the energy of the wasted heat is recovered. On the contrary, when the temperature of the engine coolant is lower than the predetermined value, it is determined the condition is not established yet.

When it is determined "Yes" in step S140, the procedure proceeds to step S200 in which the Rankine cycle starts its operating. When it is "No", the procedure goes back to step S110.

In step S200, the liquid pump 32 and the pump-motor mechanism 100 in the motor-mode are controlled precisely. Referring to FIG. 4, the operation of the Rankine cycle is described hereinafter.

In step S210, the operation is changed from the refrigerant cycle 10A to the Rankine cycle 30A. That is, the open/close valve 34 is closed and the three-way valve 21 is turned so as to circulate the engine coolant toward the heater 30.

In step S220, the liquid pump 32 starts to be operated to increase the pressure of the refrigerant flowing into the heater 30 from the liquid-fluid separator 12. At this time, since the inlet port 106 is closed by the spool 107d, the refrigerant hardly flows into the operation chamber "V"

In step S230, it is determined whether a predetermined period t1 (corresponds to a first predetermined period of the present invention) has passed. In step S240, the pump-motor mechanism 100 is started to be drove in the motor-mode as the expansion apparatus. The predetermine period t1 is a period in which the temperature of the refrigerant in the heater 30 can be raised well enough relative to the temperature of the engine coolant. At the starting of the pump-motor mechanism 100 in the motor mode, it is necessary to drive the pump-motor mechanism 100 by an external force. In this embodiment, the rotational electric machine 200 is operated as the motor to firstly orbit the movable scroll 103 up to a predetermined rotating speed. The rotating direction of the movable scroll 103 in the motor-mode is reverse relative to that of the movable scroll 103 in the pump-mode.

In step S250, the electromagnetic valve 107e is opened so that the spool 107d moves rightward in FIG. 2 to open the inlet port 106, whereby the pump-motor mechanism 100 can be operated in the motor mode. Then, the subroutine of starting the Rankine cycle 30A ends to advance to step S300.

In step S300, the Rankine cycle 30A is continuously operated. The refrigerant is heated by the heater 30 and is introduced into the high-pressure chamber 104. The superheated gas-phase refrigerant in the high-pressure chamber 104 is introduced into the operation chamber "V" through the inlet port 106 to drive the movable scroll to obtain the rotation of drive shaft 108. The shaft 108 rotates the rotor 220 to generate electricity by the rotational electric machine. The generated electricity is charged in the battery 25.

The introduced refrigerant in the operation chamber "V" is expanded so that the movable scroll 103 is kept rotating. As described above, the movable scroll 103 is rotated by the rotational electric machine 200 at the beginning. After the movable scroll 103 is began to be rotated by the force of the expanding refrigerant, the rotational electric machine 200 stops its operation as the motor. The expanded and decompressed refrigerant is discharged through the low-pressure port 111, and the rotational energy of the movable scroll 103 is transmitted to the rotor 220 of the rotational electric machine 200.

The refrigerant discharged through the low-pressure port 111 circulates through the second bypass passage 33, the check valve 33a, the condenser 11, the gas-liquid separator 12, the first bypass passage 31, the check valve 31a, the liquid pump 32, the heater 30, the high-pressure port 110 of the expansion-compression apparatus 100 in this series to establish the Rankine cycle 30A.

While the Rankine cycle 30A is operated, the rotation speed of the rotational electric machine 200 is controlled based on the engine coolant temperature so as to obtain the maximum electricity. That is, when the pressure of the refrigerant passing through the heater 30 is too high relative to the engine coolant temperature, the rotation speed of the rotational electric machine is increased to expedite the expansion of the refrigerant to decrease the pressure thereof. On the other hand, when the pressure of the refrigerant is too low, the rotational speed of the rotational electric machine is decreased to increase the pressure thereof. The Rankine cycle 30A is well operated to obtain the electricity as described above.

After the Rankine cycle 30A is continuously operated, it is determined whether the air-cooling is necessary in step S310 in the same manner as in step S110. That is, while the Rankine cycle 30A is operated, the refrigerant cycle 10a is stopped so that the interior temperature of the vehicle might be higher than the preset temperature.

When it is "No" in step S310, the procedure of the step S300 is repeated. When it is "Yes" in step S310, the operation of the Rankine cycle 30A is stopped, in which the three-way valve 21 is turned in such a manner that the engine coolant hardly flows through the heater 30.

Then, in step S400, the refrigerant cycle 10A is re-operated. The stop timing of the liquid pump 32 and the pump-motor mechanism 100 in the motor mode is precisely controlled in step S400. The starting timing of the pump-motor mechanism 100 in the pump-mode is also precisely controlled in step S400. Referring to FIGS. 5 and 6, the procedure is described in detail hereinafter.

In step S405, the liquid pump 32 is stopped, while the electricity recovery by the rotational electric machine 200 is maintained in step S410. Then, it is determined whether a predetermined period t2, which correspond to a second predetermined period in the present invention, has passed since the liquid pump is stopped in step S415A. The predetermined period t2 is a period in which the pressure of the super-heated gas refrigerant discharged from the heater 30 decreases until no expansion is obtained.

When it is "No" in step S415A, the procedure of step S410 is repeated. When it is "Yes" in step S415A, the pump-motor mechanism 100 is changed into the pump-mode. The electromagnetic valve 107e is closed so that the spool 107d closes the inlet port 106. Then, the rotational electric machine 200 stops to generate the electricity in step S425. The open/close valve 34 opens in step S430, so that the cycle operation is changed from the Rankine cycle 30A to the refrigerant cycle 10A.

When the refrigerant cycle 10A is operated, it is determined whether the Rankine cycle 30A was being operated at the previous step in step S435. When it is "Yes" in step S440, the procedure proceeds to step S440 in which it is determined whether the pressure of low-pressure side of the pump-motor mechanism 100 is not less than a predetermined value P3, which corresponds to a third predetermined pressure in the present invention. When it is determined that the pressure is not less than the predetermined value P3, the procedure proceeds to step S445. The predetermined pressure P3 is a pressure in which the pump-motor mechanism 100 can be operated in the pump-mode without an excessive initial torque.

In step S445, the rotational electric machine 200 is operated as an electric motor, which drive the pump-motor mechanism 100 in the pump-mode. At the time when the lower-side pressure is decreased lower than the predetermined pressure P3, the driving power source of the pump-motor mechanism 100 is changed from the rotational electric machine 200 to the engine 20 in step S450. This is done by stopping the rotational electric machine 200 and by engaging the electromagnetic clutch 300.

When it is "No" in step S435, the procedure proceeds to step S445. When it is "No" in step S440, it is determined that the lower-side pressure is not enough to drive the pump-motor mechanism 100 by the rotational electric machine 200, then the procedure proceeds to step S450 in which the pump-motor mechanism 100 is driven by the engine 20. Thereafter, the procedure proceeds to step S120 in which the refrigerant cycle 10A is operated continuously as described above.

According to the present embodiment, following effects can be obtained.

When the cycle operation is changed from the refrigerant cycle 10A to the Rankine cycle 30A, the pump-motor mechanism 100 is brought to be operated in the motor-mode after the predetermined period t1 has elapsed since the liquid pump 32 was operated (step S220–step S240).

At this time, after the rotational electric machine 200 is operated as the motor, the spool 104d opens the inlet port 106 in order to change the operation mode from the pump-mode to the motor-mode (step S240–step S250). Thus, the energy of the heated refrigerant can be efficiently converted to the kinetic energy.

When the cycle operation is changed from the Rankine cycle 30A to the refrigerant cycle 10A, the pump-motor mechanism 100 in the motor-mode is stopped after the liquid pump 32 is stopped and the predetermined period t2 elapsed (step S405–step S420). Thus, the super-heated gas refrigerant is expanded in the pump-motor mechanism 100 within the predetermined time t2 to recover the heat energy of the refrigerant efficiently.

At this time, the pressure of the refrigerant is reduced by the operation of the pump-motor mechanism 100, and the initial torque to drive the pump-motor mechanism 100 in the pump-mode is prevented from becoming high. Thus, the load of the engine 20 is reduced.

Furthermore, when the pump-motor mechanism 100 is stopped, the rotational electric machine 200 is stopped after the spool 107d closes the inlet port 106 to change the operation mode from the motor-mode to the pump-mode (step S420–step S425). Thus, after the rotational power of the pump-motor mechanism 100 in the motor-mode (expansion) is consumed, the electric rotation mechanism 200 is stopped, so that the rotational electric machine 200 does not serve as a brake canceling the expansion energy. That is, unnecessary electricity is hardly consumed.

When the pump-motor mechanism 100 starts to be operated in the pump-mode, the rotational electric machine 200 initially drive the pump-motor mechanism 100, then the engine 20 drive the pump-motor mechanism 100 instead of the rotational electric machine 200 (step S445–step S450). Thus, the engine 20 is not required to start to drive the pump-motor mechanism 100 initially, so that a fluctuation of the engine speed is restricted.

At this time, it is determined whether the rotational electric machine 200 should be operated (step S440–step S445), so that the rotational electric machine 200 is prevented from being operated unnecessary.

Furthermore, the pump-motor mechanism 100 serves as a compressor and an expansion device, the system 1 becomes compact.

In step S230 of the sub-flowchart shown in FIG. 4, the predetermine period t1 can be replaced by a predetermined pressure P1 of the refrigerant (a first predetermined pressure in the present invention). When the pressure of the refrigerant compressed by the liquid pump 32 becomes higher than the predetermined pressure P1, the pump-motor mechanism 100 can start to be operated in the motor-mode.

In steps S440–step S445 of the sub-flowchart in FIG. 6, the rotational electric machine 200 operates the pump-motor mechanism 100 according to the lower-side pressure. Instead of that, after the rotational electric machine 200 drives the pump-motor mechanism 100 for a predetermined period t3 (a third predetermined period of the present invention), the engine 20 can operate the rotational electric machine 200.

[Second Embodiment]

Figure 7:
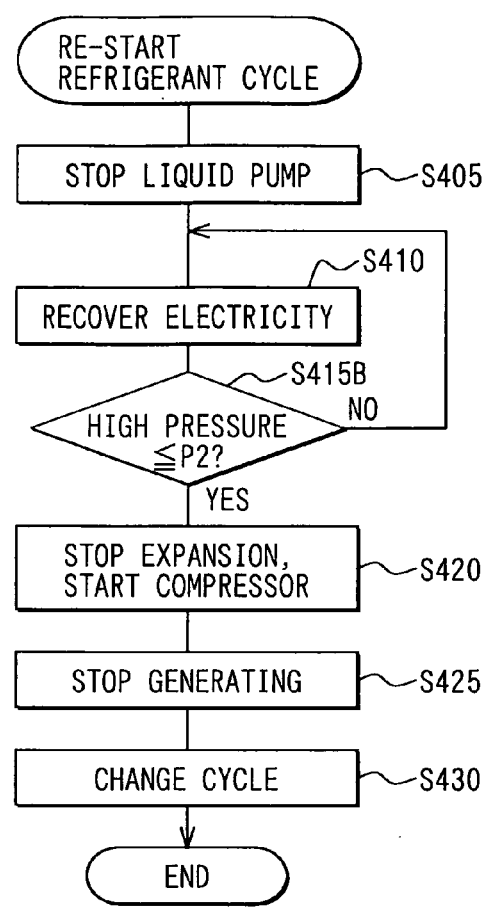
FIG. 7 is a sub-flowchart in which the refrigerant cycle is re-stared according to a second embodiment of the present invention.
Figure 8:
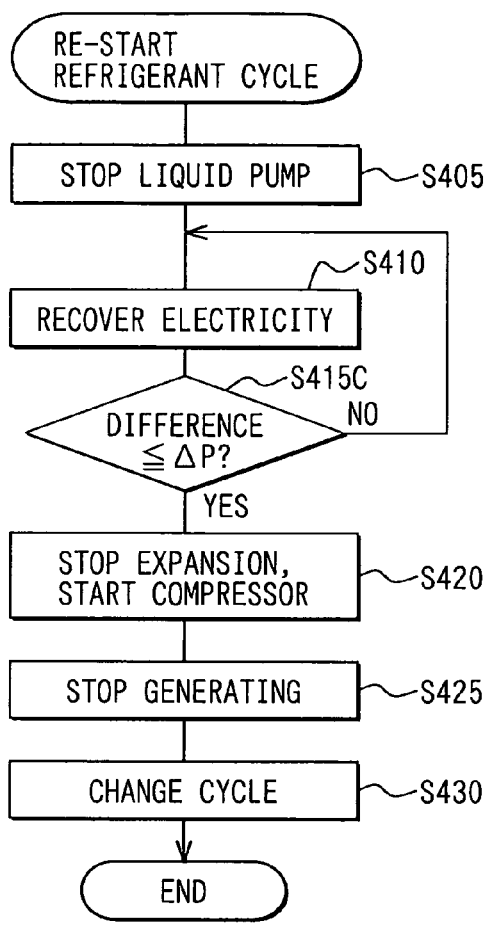
FIG. 8 is a sub-flowchart in which the refrigerant cycle is re-stared according to a second embodiment of the present invention.
Figure 9:
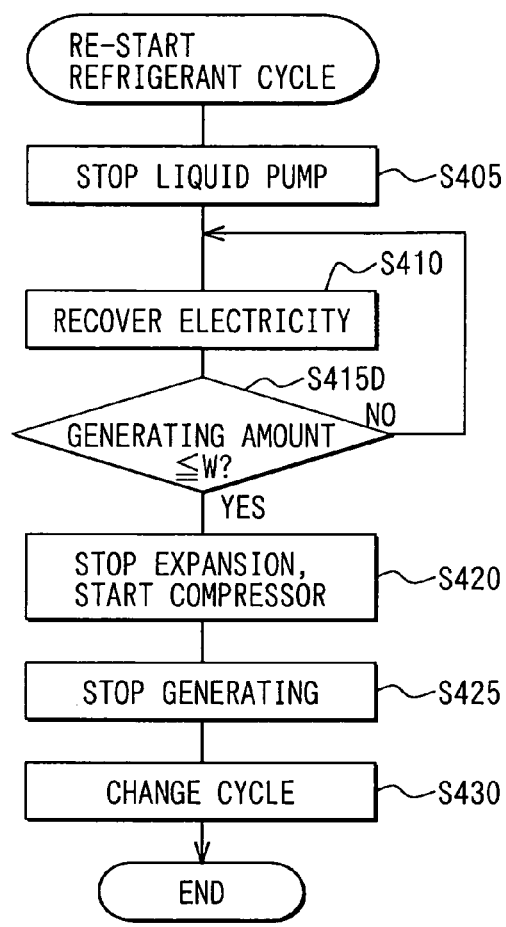
FIG. 9 is a sub-flowchart in which the refrigerant cycle is re-stared according to a second embodiment of the present invention.

Referring to FIGS. 7 to 9, the second embodiment is described hereinafter. The difference between FIG. 5 and FIG. 7 is that step S415A in FIG. 5 is replaced by step S415B in FIG. 7.

That is, after the liquid pump 32 is stopped in step S405, it is determined whether the higher-side pressure of the refrigerant is decreased lower than the predetermined pressure P2 (a second predetermined pressure of the present invention) in step S415B. The second predetermined pressure P2 is a pressure in which no expansion is occurred in the pump-motor mechanism 100.

Alternatively, as indicated in step S415C in FIG. 8, it can be determined whether the pressure difference between the higher-side pressure and the lower-side pressure of the liquid pump 32 is decreased lower than a predetermined pressure difference $\Delta P$.

When the predetermine pressure P2 is used in step S415B, the predetermined pressure P2 is not always precise in the case that the higher-side pressure of the Rankine cycle 30A is low level. By using the predetermined pressure difference ΔP, the determination in which the pump-motor mechanism 100 in the motor-mode is stopped is precisely conducted.

Alternatively, as indicated in step S415D in FIG. 9, it can be determined whether the amount of generated electricity by the rotational electric machine 200 decreases lower than a predetermined amount of generated electricity W.

[Third Embodiment]

Figure 10:
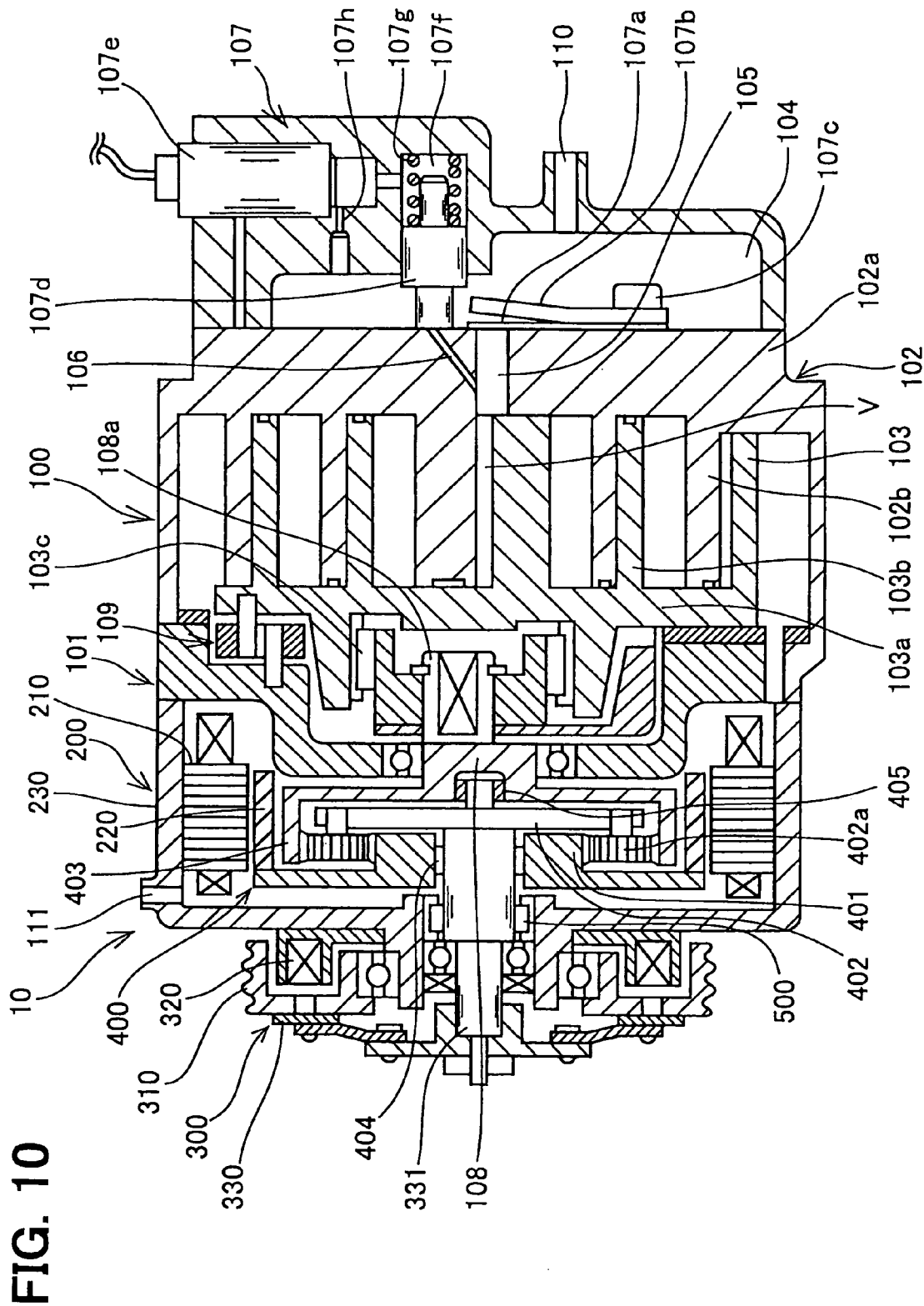
FIG. 10 is a longitudinal sectional view of an expansion-compression device according to the first embodiment of the present invention.

FIG. 10 illustrates the third embodiment, in which the expansion-compression device 10 is altered comparing with the first and second embodiments.

The expansion-compression device 10 has a variable speed mechanism 400 including a planetary gear mechanism which can switch a power transmitting route and increase/decrease the speed of the rotation.

The variable speed mechanism 400 has a sun gear 401 at the center thereof, a pinion gear 402a, a planetary carrier 402, and a ring gear 403.

The sun gear 401 is integrated with the rotor 220 of the rotational electric machine 200. The planetary carrier 402 is integrated with the shaft 331 which rotates with the friction plate 330 of the electromagnetic clutch 300. The ring gear 403 is integrated with the shaft 108.

A one-way clutch 500 is disposed between the shaft 331 and the stator housing 230. The one-way clutch 500 allows the rotational of the shaft 331 in one direction, which corresponds to the rotative direction of the pulley 310. A bearing 404 rotatably supports the sun gear 401 and the rotor 220 with respect to the shaft 331, and a bearing 405 rotatably supports the shaft 331 (the planetary carrier 402) with respect to the shaft 108.

When the electromagnetic clutch 300 is engaged to transmit the rotative power to the expansion-compression device 10 from the engine 20, the pump-motor mechanism 100 is operated in the pump-mode in high speed by applying the electricity to the rotational electric machine 200 in such a manner that rotational torque is generated in the rotor 220 so as not to rotate the sun gear 401 and the rotor 220. The rotative speed of the pump-motor mechanism 100 is varied by changing the rotative speed of the rotational electric machine 200.

When the electromagnetic clutch 300 is disengaged, the rotational electric machine 200 receives the electricity to rotate the pump-motor mechanism 100 in such a manner that the rotational electric machine 200 rotates in the opposite direction to the rotation of pulley 310, so that the pump-motor mechanism 100 is operated in the pump-mode. At this moment, the shaft 331 and the planetary carrier 402 do not rotate by the one-way clutch 500, so that the rotative force of the rotational electric machine 200 is reduced by the variable speed mechanism 400 and is transferred to the pump-motor mechanism 100.

The pump-motor mechanism 100 is operated in the motor-mode, receiving the super-heated refrigerant from the heater 30 in the condition that the electromagnetic clutch 300 is disengaged. At this time, the shaft 331 does not rotate by the one-way clutch 500, so that the rotative force of the pump-motor mechanism 100 is expedited to be transferred to the rotational electric machine 200 in order to generate the electricity.

In the expansion-compression device 10, during the operation of refrigerant cycle 10A, the rotational electric machine 200 is operated as the generator. Thus, when the refrigerant cycle 10A is re-operated in step S400 in FIG. 3, step S425 in FIG. 5 can be skipped in order to reduce the energy loss due to the acceleration and deceleration of the rotational electric machine 200.

[Other Embodiment]

In the above embodiments, the pump-motor mechanism 100 has a function of compressor and a function of expansion device. Alternatively, the compressor and the expansion device can be provided separately, which are arranged in parallel between the evaporator 14 and the heater 30.

The pump-motor mechanism 100 can adopt a rotary type, a piston type, a vane type and the like besides a scroll type. The generated electricity can be changed to kinetic energy by means of a flywheel or a spring.

Figure 11:
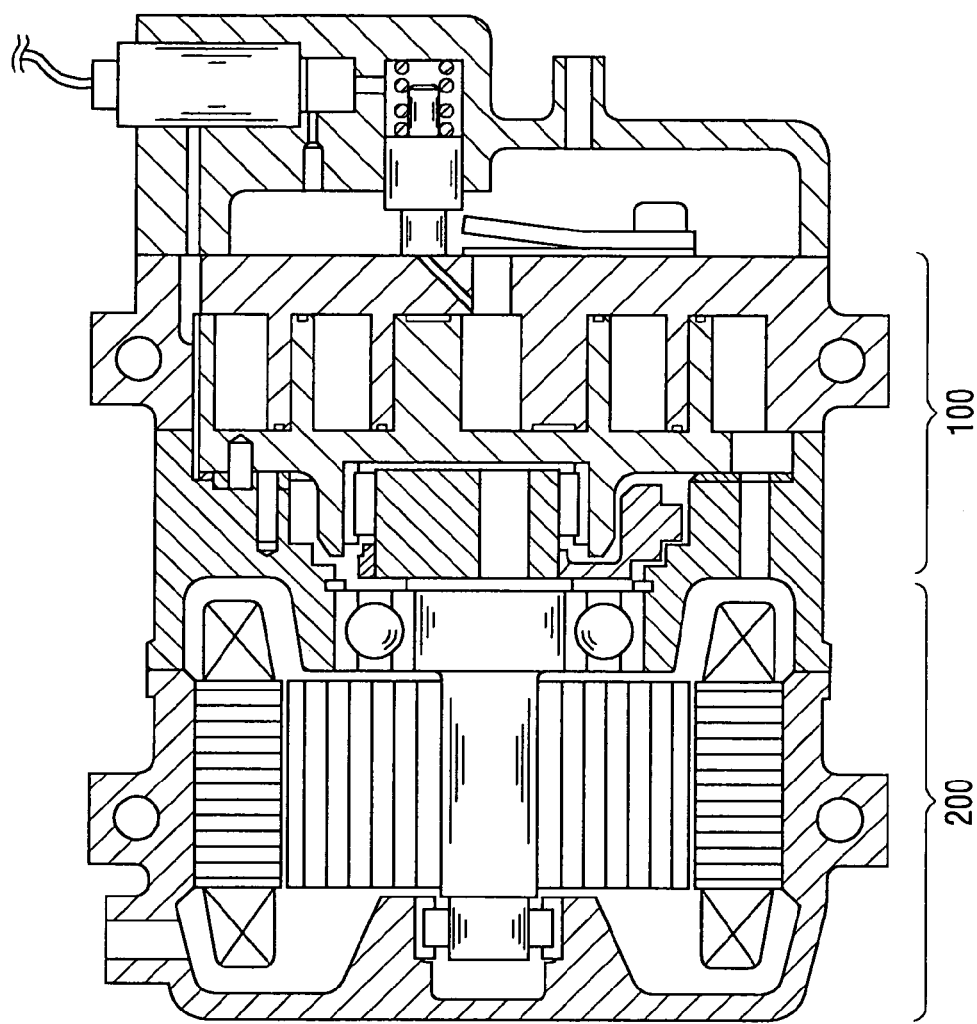
FIG. 11 is a longitudinal sectional view of an expansion-compression device according to the other embodiment of the present invention.

Although the pump-motor mechanism 100 is driven by the engine 20 in the above embodiments, the pump-motor mechanism 100 can be driven by the rotational electric machine 200 as shown in FIG. 11. In FIG. 11, the same descriptions of the same part and components shown in FIG. 2 will not be reiterated.

Figure 12:
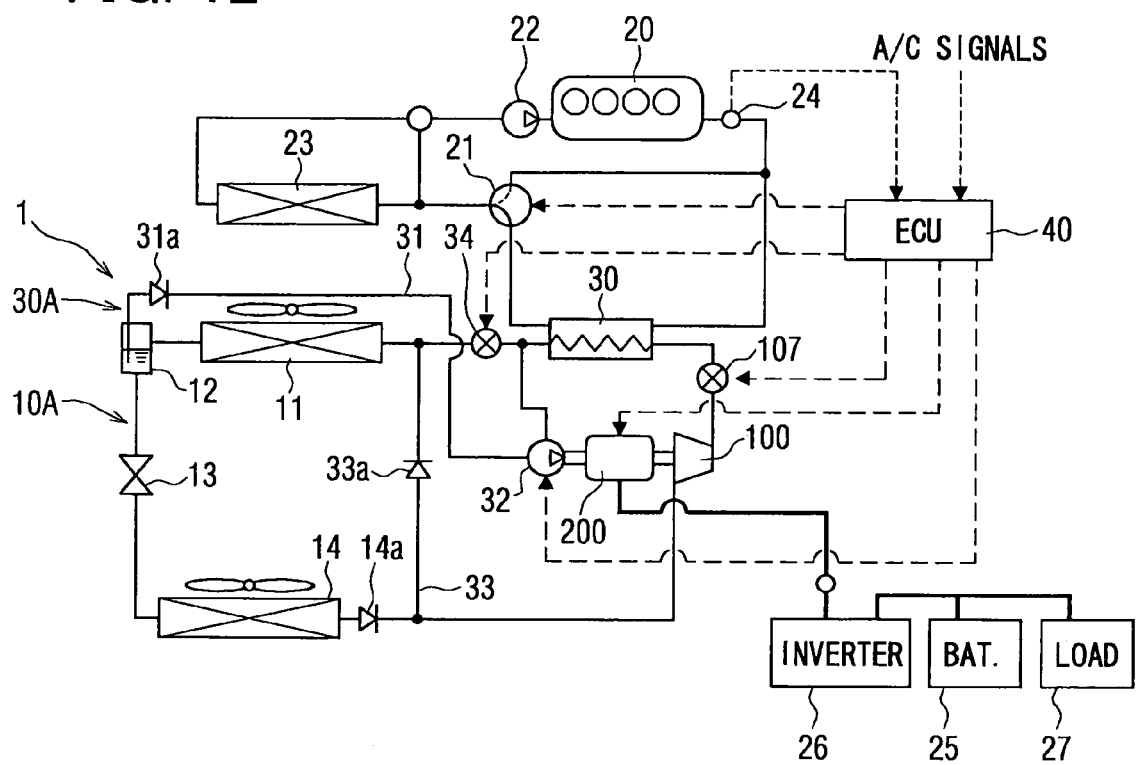
FIG. 12 is a schematic view of a system utilizing waste heat for an internal combustion engine according to the other embodiment of the present invention.
Figure 13:
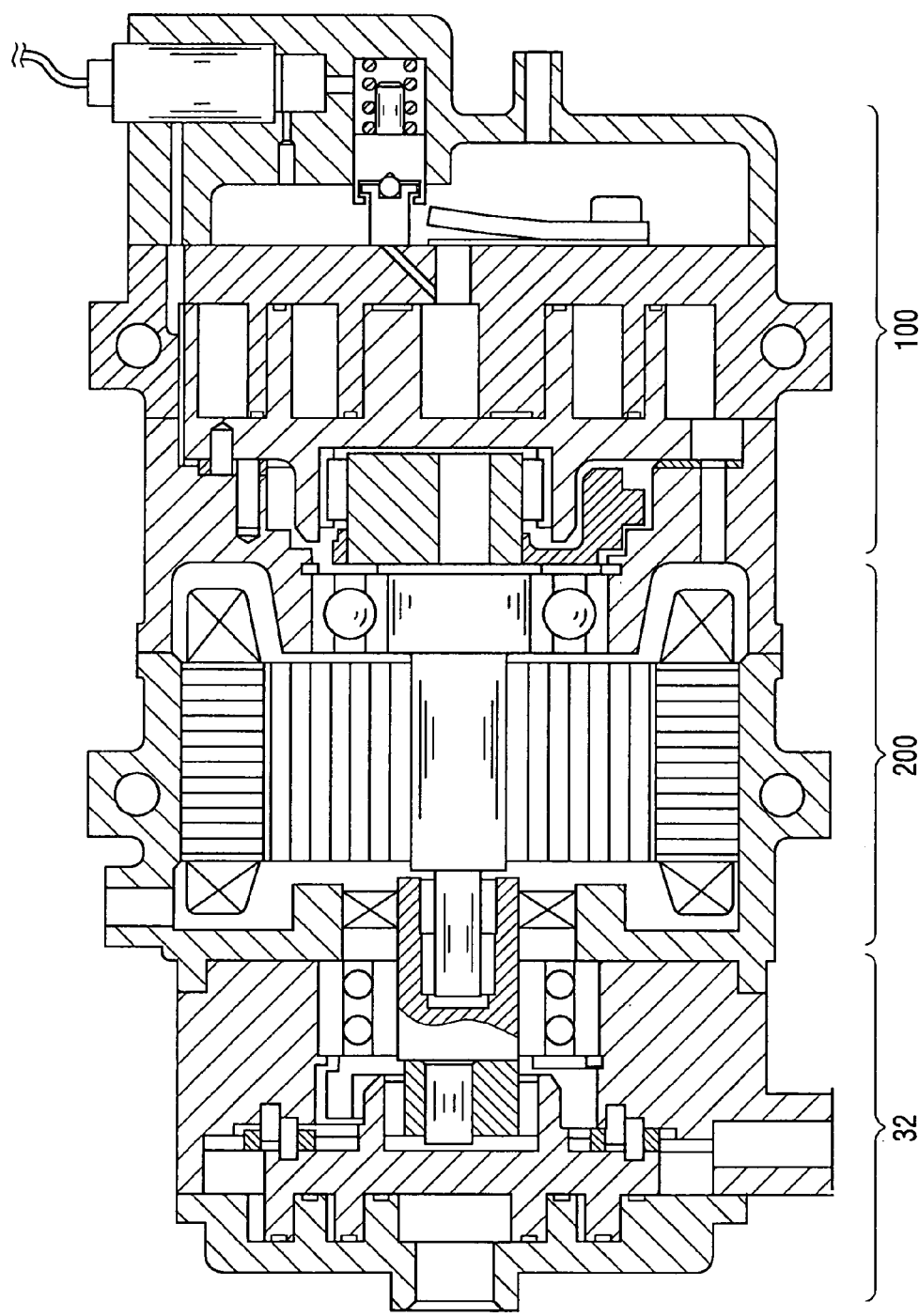
FIG. 13 is a longitudinal sectional view of an assembly of the liquid pump, the rotational electric machine, and a pump-motor mechanism.

Furthermore, the liquid pump 32 can be disposed in such a manner that the rotation shaft of the liquid pump 32 is connected to the rotation shaft of the rotational electric machine 200 as shown in FIG. 12. FIG. 13 is a longitudinal sectional view of an assembly of the liquid pump 32, the rotational electric machine 200, and a pump-motor mechanism 100. The same descriptions of the same part and components shown in FIGS. 1 and 2 will not be reiterated.

What is claimed is:

1. A system utilizing a waste heat of a power source, the system comprising:
a Rankine cycle including a condenser cooling a refrigerant; a pump pumping the refrigerant from the condenser; a heater heating the refrigerant pumped by the pump with the waste heat of the power source; and an expansion device transforming pressure energy of the refrigerant from the heater into a kinetic energy by expanding the refrigerant from the heater; and
a controller switching an operation status of the pump and the expansion device to activate or deactivate the Rankine cycle, the controller obtaining a time delay between the switching of operation status of the pump and the switching of operation status of the expansion device.

2. The system according to claim 1, wherein
the controller switches the operation status of the pump and the expansion device to activate and deactivate the Rankine cycle.

3. The system according to claim 1, further comprising:
a refrigerant cycle including the condenser commonly used in the Rankine cycle.

4. The system according to claim 3, wherein
the controller switches the operation status of the pump and the expansion device to change the cycle activated from the refrigerant cycle to the Rankine cycle.

5. The system according to claim 3, wherein
the controller switches the operation status of the pump and the expansion device to change the cycle activated from the Rankine cycle to the refrigerant cycle.

6. A system utilizing a waste heat of an internal combustion engine, the system comprising:
a refrigerant cycle including a compressor and a condenser, the compressor compressing a refrigerant receiving a driving force from the internal combustion engine, the condenser cooling the refrigerant discharged from the compressor;
a Rankine cycle including the condenser commonly used in the refrigerant cycle; a pump pressurizing the refrigerant flowing out from the condenser; a heater heating the refrigerant discharged from the pump with the waste heat of the internal combustion engine; and an expansion device generating a kinetic energy by expanding the gas-phase refrigerant flowing out of the heater; and a controller switching an operation cycle between the refrigerant cycle and the Rankine cycle, and controlling operations of the refrigerant cycle and the Rankine cycle, wherein the controller starts an operation of the expansion device after the pump is operated when the refrigerant cycle is changed into the Rankine cycle.

7. The system according to claim 6, wherein
the controller starts the operation of the expansion device after a first predetermined period has elapsed since the pump was started.

8. The system according to claim 6, wherein
the controller starts the operation of the expansion device after the pressure of the refrigerant pressurized by the pump has increased more than or equal to a first predetermined pressure.

9. The system according to claim 6, wherein
the expansion device is coupled to the rotational electric machine having functions of a generator and a motor, and
the controller starts an operation of the rotational electric machine as the motor before the expansion device is operated.

10. The system according to claim 9, further comprising
a valve mechanism switching between the compressor and the expansion device into which the refrigerant flows, wherein
when the expansion device is operated, the controller controls the valve mechanism in such a manner that the compressor is switched to the expansion device into which the refrigerant flows after the rotational electric machine has been operated as the motor.

11. The system according to claim 6, wherein
when the compressor receives the refrigerant from the heater, the compressor serves as the expansion device.

12. The system according to claim 6, wherein
the expansion device is coupled to a generator converting the kinetic energy to an electric energy.

13. The system according to claim 6, further comprising
a motor driving the compressor, wherein
the controller selects at least one of the motor and the internal combustion engine as a driving power source of the compressor.

14. A system utilizing a waste heat of an internal combustion engine, the system comprising:
a refrigerant cycle including a compressor and a condenser, the compressor compressing a refrigerant receiving a driving force from the internal combustion engine, the condenser cooling the refrigerant discharged from the compressor;
a Rankine cycle including the condenser commonly used in the refrigerant cycle; a pump pressurizing the refrigerant flowing out from the condenser; a heater heating the refrigerant discharged from the pump with the waste heat of the internal combustion engine; and an expansion device generating a kinetic energy by expanding the gas-phase refrigerant flowing out of the heater; and a controller switching an operation cycle between the refrigerant cycle and the Rankine cycle, and controlling operations of the refrigerant cycle and the Rankine cycle, wherein the controller stops an operation of the expansion device after the pump has been stopped when the Rankine cycle is changed into the refrigerant cycle.

15. The system according to claim 14, wherein
the controller stops the operation of the expansion device after a second predetermined period has elapsed since the pump was stopped.

16. The system according to claim 14, wherein
the controller stops the operation of the expansion device after the pressure of the refrigerant pressurized by the pump has decreased less than or equal to a second predetermined pressure.

17. The system according to claim 14, wherein
the controller stops the operation of the expansion device after a pressure difference between a higher-side pressure and a lower-side pressure of the pump has decreased less than or equal to a predetermined pressure difference.

18. The system according to claim 14, wherein
the expansion device is coupled to a generator, and
the controller stops an operation of the expansion device after an amount of electricity generated by the generator has decreased less than or equal to a predetermined generating amount.

19. The system according to claim 14, further comprising
a valve mechanism switching between the compressor and the expansion device into which the refrigerant flows, wherein
the expansion device is couple to a generator, and
when the expansion devise is stopped, the controller controls the valve mechanism in such a manner that the generator is stopped after the expansion devise is switched to the compressor into which the refrigerant flows.

20. The system according to claim 14, further comprising
a motor driving the compressor, wherein
the controller selects at least one of the motor and the internal combustion engine as a driving power source of the compressor, and
when the expansion device is stopped to operate the refrigerant cycle, the controller controls the compressor in such a manner that the compressor is driven by the internal combustion engine after driven by the motor.

21. The system according to claim 20, wherein
the controller determines whether it is necessary to drive the compressor by the motor based on a lower-side pressure of the compressor.

22. The system according to claim 21, wherein
the controller controls the motor in such a manner to drive the compressor until the lower-side pressure of the compressor becomes less than or equal to a third predetermined pressure.

23. The system according to claim 20, wherein
the controller controls the compressor in such a manner that the compressor is operated for a third predetermined period.

* * * * *